US012421859B2

United States Patent
Merritt et al.

(10) Patent No.: US 12,421,859 B2
(45) Date of Patent: *Sep. 23, 2025

(54) METAL PLATED ADDITIVELY MANUFACTURED PLASTIC SEAL PLATES AND THEIR METHOD OF MANUFACTURING

(71) Applicant: Hamilton Sundstrand Corporation, Charlotte, NC (US)

(72) Inventors: Brent J. Merritt, Southwick, MA (US); Viktor Kilchyk, Lancaster, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 95 days.

This patent is subject to a terminal disclaimer.

(21) Appl. No.: 18/104,509

(22) Filed: Feb. 1, 2023

(65) Prior Publication Data
US 2024/0254888 A1    Aug. 1, 2024

(51) Int. Cl.
*F01D 11/00*   (2006.01)
*B33Y 10/00*   (2015.01)
*B33Y 80/00*   (2015.01)

(52) U.S. Cl.
CPC ............ *F01D 11/006* (2013.01); *B33Y 10/00* (2014.12); *B33Y 80/00* (2014.12); *F05D 2240/55* (2013.01);
(Continued)

(58) Field of Classification Search
CPC ............... F01D 11/006; F05D 2240/55; F05D 2300/603; F05D 2300/5021; B33Y 10/00; B33Y 80/00
See application file for complete search history.

(56) References Cited

U.S. PATENT DOCUMENTS 7,927,708 B2    4/2011    Mizrahi
9,427,835 B2    8/2016    Cheung et al.
(Continued)

FOREIGN PATENT DOCUMENTS

CA    2917967 A1    1/2015
CN    101600817 A    12/2009
(Continued)

OTHER PUBLICATIONS

"The Best of Both Worlds: A New Take on Metal-Plastic Hybrid 3D Printing", Waseda University, Oct. 5, 2020 [online], [retrieved on Feb. 27, 2023]. Retrieved from the Internet <URL: https://www.sciencedaily.com/releases/2020/10/201005101542.htm>.
(Continued)

*Primary Examiner* — Eugene G Byrd
(74) *Attorney, Agent, or Firm* — Kinney & Lange, P.A.

(57) ABSTRACT

In one aspect, a seal plate for a rotary machine includes a hub centered on a central axis and a disk portion extending radially outward from the hub. The hub and the disk portion include a plastic substrate and metal plating disposed on at least apportion of an outer surface of the plastic substrate. The plastic substrate has a matrix material and fibers embedded in the matrix material. The fibers have a first coefficient of thermal expansion. The metal plating has a second coefficient of thermal expansion. The fibers are selected such that a bulk coefficient of thermal expansion of the plastic substrate at the outer surface of the plastic substrate substantially matches the second coefficient of thermal expansion of the metal plating.

20 Claims, 5 Drawing Sheets

(52) U.S. Cl.
CPC ............... *F05D 2300/5021* (2013.01); *F05D 2300/603* (2013.01)

(56) References Cited

U.S. PATENT DOCUMENTS

| | | | |
|---|---|---|---|
| 9,777,593 | B2 | 10/2017 | Kirkpatrick et al. |
| 9,920,429 | B2 | 3/2018 | Carlsten et al. |
| 10,519,965 | B2 | 12/2019 | Xie |
| 10,655,470 | B2 | 5/2020 | Okabe et al. |
| 10,677,090 | B2 | 6/2020 | Sakala et al. |
| 10,927,843 | B2 | 2/2021 | Roach et al. |
| 11,268,526 | B2 | 3/2022 | Roach et al. |
| 11,802,488 | B2 * | 10/2023 | Merritt .................. F01D 11/00 |
| 11,970,951 | B1 * | 4/2024 | Kilchyk ................. B33Y 10/00 |
| 2012/0148391 | A1 | 6/2012 | Ibaraki et al. |
| 2012/0263585 | A1 | 10/2012 | Matsuyama |
| 2013/0001321 | A1 | 1/2013 | Pelletier et al. |
| 2013/0121817 | A1 * | 5/2013 | Boehm ................. F04D 29/426 415/203 |
| 2013/0154194 | A1 | 6/2013 | Van |
| 2013/0260130 | A1 | 10/2013 | Taxacher et al. |
| 2014/0248156 | A1 | 9/2014 | Parkos et al. |
| 2016/0160353 | A1 | 6/2016 | Miarecki et al. |
| 2016/0160869 | A1 | 6/2016 | Roach et al. |
| 2016/0167791 | A1 | 6/2016 | Roach et al. |
| 2016/0169012 | A1 | 6/2016 | Dacunha et al. |
| 2019/0170254 | A1 | 6/2019 | Taslakian et al. |
| 2020/0018260 | A1 | 1/2020 | Garcia et al. |
| 2020/0157968 | A1 | 5/2020 | Braun et al. |
| 2021/0054852 | A1 | 2/2021 | Verma et al. |
| 2021/0323245 | A1 * | 10/2021 | Lochner ................. B29C 70/34 |
| 2022/0145768 | A1 | 5/2022 | Angel et al. |
| 2023/0085189 | A1 * | 3/2023 | Merritt ................. F04D 29/053 464/183 |
| 2023/0193047 | A1 | 6/2023 | Gettings et al. |
| 2023/0235672 | A1 | 7/2023 | Albers |
| 2024/0254888 | A1 * | 8/2024 | Merritt ................. F01D 11/003 |
| 2024/0271727 | A1 * | 8/2024 | Kilchyk ................. F16L 23/04 |

FOREIGN PATENT DOCUMENTS

| | | |
|---|---|---|
| CN | 102472115 B | 6/2015 |
| DE | 102004039473 A1 | 3/2006 |
| DE | 102007024130 A1 | 12/2008 |
| DE | 102007048852 B4 | 2/2016 |
| RU | 2611137 C1 | 2/2017 |
| WO | 2009031632 A1 | 3/2009 |

OTHER PUBLICATIONS

A. Freier, "New 3D Printing Technique Allows for Better Control of Composite Material Fiber Orientation" Jan. 16, 2018 [online] [retrieved Feb. 27, 2023] <URL:https://all3dp.com/new-3d-printing-technique-allows-better-control-composite-material-fiber-orientation/>.

A. Pearson, et al., "Novel polyurethane elastomeric composites reinforced with alumina, aramid . . . " from Composite Part B: Engineering, vol. 122, Aug. 1, 2017, 6 pages <https://doi.org/10.1016/j.compositesb.2017.04.017>.

B. Coxworth. "Hybrid 3D printing tech produces plastic-metal items" New Atlas, Oct. 6, 2020 [online], [retrieved on Feb. 27, 2023]. Retrieved from the Internet <URL: https://newatlas.com/3d-printing/hybrid-3d-printing-plastic-metal-items/>.

G. Gardiner, "Magnetic 3D Printing the next generation of tailored composites", Jul. 26, 2019 [online], [retrieved on Feb. 27, 2023]. Retrieved from <URL:https://www.compositesworld.com/articles/magnetic-3d-printing-the-next-generation-of-tailored-composites>.

N. Giani, et al., "Towards sustainability in 3D printing of thermoplastic composites: Evaluation of recycled carbon fibers . . . ", from Composites Part A: Applied Sci & Mfg, vol. 159, Aug. 2022, 6 pages <https://doi.org/10.1016/j.compositesa.2022.107002>.

The Best of Both Worlds: A New Take on Metal-Plastic Hybrid 3D Printing, Waseda University, Oct. 5, 2020 [online], [retrieved on Feb. 27, 2023]. Retrieved from the Internet <URL: https://www.waseda.jp/top/en/news/73810>.

"Fiberglass Fabrics & Composites" JPS [online], Retrieved from the Internet <URL:https://jpscm.com/why-fiberglass/>, 2022, 5 pages.

"Plastic Thermal Expansion—Thermal Expansion of Engineering Thermoplastics" [online], Retrieved from the Internet <URL:https://www.azom.com/suppliers.aspx?SupplierID=1356>, 2020, 6 pages.

"Thermal Expansion of Metals", The Engineering Toolbox [online], Retrieved from Internet: URL:https://www.engineeringtoolbox.com/thermal-expansion-metals-d_859.html>, 2020, 7 pages.

Extended European Search Report for EP Application No. 24154670.4, dated Jul. 23, 2024, 7 pages.

Extended European Search Report for EP Application No. 24155028.4, dated Jul. 15, 2024, 5 pages.

Extended European Search Report for EP Application No. 24155287.6, dated Jul. 15, 2024, 5 pages.

Extended European Search Report for EP Application No. 24155310.6, dated Jul. 15, 2024, 6 pages.

Extended European Search Report for EP Application No. 24155387.4, dated Jul. 15, 2024, 6 pages.

* cited by examiner

METAL PLATED ADDITIVELY MANUFACTURED PLASTIC SEAL PLATES AND THEIR METHOD OF MANUFACTURING

BACKGROUND

The present disclosure relates generally to aviation components and, more particularly, to metal-plated plastic seal plates.

Metal-plated plastic aviation components have been developed as a lightweight, high-strength, alternative to metal components. Metal-plated plastic components include a plastic or plastic substrate coated with a metal plating on an outer surface. The metal plating increases the strength and abrasion resistance of the component. Metal-plated plastic components have been particularly attractive for use in gas turbine engine applications, where they can provide overall weight reduction of the engine to improve engine efficiency and provide fuel cost savings.

Limitations in use of metal-plated plastic components include poor adhesion between the metal plating and the plastic substrate, which reduces long-term component durability. Various methods of manufacture and mechanical locking features have been developed to improve an interfacial bond strength between the metal plating the plastic at variable temperatures, as separation of the metal plating can occur.

SUMMARY

In one aspect, a seal plate for a rotary machine includes a hub centered on a central axis and a disk portion extending radially outward from the hub. The hub and the disk portion include a plastic substrate and metal plating disposed on at least apportion of an outer surface of the plastic substrate. The plastic substrate has a matrix material and fibers embedded in the matrix material. The fibers have a first coefficient of thermal expansion. The metal plating has a second coefficient of thermal expansion. A bulk coefficient of thermal expansion of the plastic substrate at the outer surface of the plastic substrate substantially matches the second coefficient of thermal expansion of the metal plating.

In another aspect, a method of forming a seal plate for a rotary machine includes forming, by an additive manufacturing process, a plastic substrate having an outer surface, impregnating, by the additive manufacturing process, the plastic substrate with fibers having a first coefficient of thermal expansion, and applying a metal plating to the outer surface of the plastic substrate. The metal plating has a second coefficient of thermal expansion. A bulk coefficient of thermal expansion of the plastic substrate at the outer surface of the plastic substrate substantially matches the second coefficient of thermal expansion of the metal plating. The plastic substrate and the metal plating together form the seal plate having a hub centered on a central axis and having a disk portion extending radially outwards from the hub.

The present summary is provided only by way of example, and not limitation. Other aspects of the present disclosure will be appreciated in view of the entirety of the present disclosure, including the entire text, claims and accompanying figures.

DETAILED DESCRIPTION

The present disclosure is directed to metal-plated additively manufactured plastic aviation rotating shaft components with controlled thermal expansion behavior to reduce component damage caused by operation in environments of varying temperature or temperature gradients.

Figure 1:
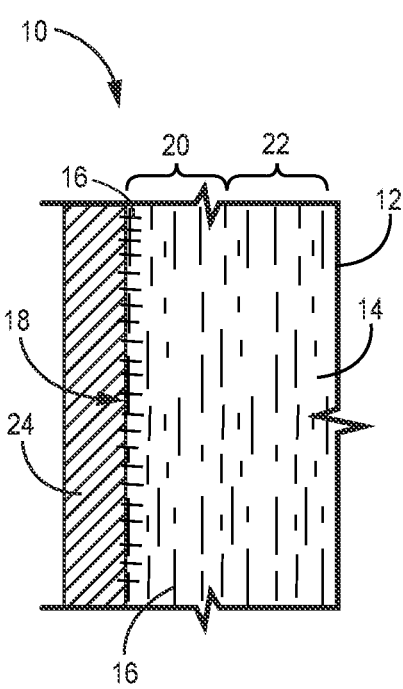
FIG. 1 is a simplified cross-sectional view of a portion of a metal-plated component.

FIG. 1 is a simplified cross-sectional view of a portion of a metal-plated plastic component. FIG. 1 shows component 10, substrate 12, matrix 14, fibers 16, outer surface 18, outer region 20, inner region 22, and metal plating 24. Component 10 can be a rotating shaft component of a turbomachine, including but not limited to a thrust shaft, a compressor and fan shaft, or a turbine shaft. Substrate 12 has outer surface 18, outer region 20, and inner region 22. Outer region 20 is adjacent to outer surface 18. Inner region 22 is separated from outer surface 18 by outer region 20. Substrate 12 includes matrix 14 and fibers 16. Fibers 16 are embedded in matrix 14. Metal plating 24 is disposed on outer surface 18 of substrate 12.

Substrate 12 includes matrix 14 and fibers 16. Matrix 14 is a plastic or polymer material. Matrix 14 can be a thermoplastic. Matrix 14 can include but is not limited to acrylonitrile butadiene styrene (ABS), polyetherimide (PEI), thermoplastic polyimide, polyether ether ketone (PEEK), polyether ketone ketone (PEKK), polysulfone, polyamide, polyphenylene sulfide, polyester, polyimide, and combinations thereof. Matrix 14 can define a shape of substrate 12. Matrix 14 can be formed of a plurality of materials with individual materials selectively located in substrate 12 to provide desired material properties in different regions of component 10. In some embodiments, substrate 12 can include one or more voids or open sections or structures, such as a hollow core or openings formed between internal support structures.

Fibers 16 are embedded in matrix 14. Fibers 16 are selected and arranged to control a bulk coefficient of thermal expansion (CTE) of substrate 12. Fibers 16 are selected and arranged in substrate 12 to reduce a CTE mismatch between substrate 12 and metal plating 24. Substrate 12 with fibers 16 can be designed to have a bulk CTE substantially matching a CTE of metal plating 24 to prevent separation of metal plating 24 from outer surface 18 during operation of component 10 in varying temperatures. Fibers 16 can be selected and arranged to meet additional functional requirements of component 10 including stress reduction, deflection management, and energy containment as described further herein.

Matrix 14 can be formed of a material having a CTE greater than the CTE of metal plating 24. Fibers 16 can be formed of material having a lower CTE than the CTE of matrix 14 to lower the bulk CTE of substrate 12. Fibers 16 constrain thermal expansion of substrate 12. Fibers 16 can include but are not limited to carbon, metal, para-aramid (e.g., Kevlar® and Twaron®), glass, and combinations thereof. In some embodiments, fibers 16 can be formed of the same material as metal plating 24. In some embodiments, subsets of fibers 16 can be formed of different materials. Regions of substrate 12 can include fibers 16 formed of the same material or different materials. The combinations of materials forming matrix 14 and fibers 16 can vary throughout a component to provide desired material properties.

Fibers 16 can be continuous fibers, discontinuous fibers, or combinations thereof. Fibers 16 can have a filament diameter and length selected to minimize cracking of substrate 12 caused by separation at fiber-matrix interfaces. A concentration and arrangement of fibers 16 can be selected to provide substrate 12 with a bulk CTE substantially matching the CTE of metal plating 24. As shown in FIG. 1, fibers 16 can be substantially uniformly distributed throughout matrix 14 to provide an entirety of substrate 12 with a bulk CTE substantially matching the CTE of metal plating 24. As discussed further herein, in some embodiments, fiber placement can be tailored to control a bulk CTE of one or more regions of substrate 12.

Fibers 16 can be disposed to extend parallel to outer surface 18 and metal plating 24 and/or perpendicular or otherwise angled relative to metal plating 24. Fibers 16 extending perpendicular to otherwise angled relative to metal plating 24 can extend through outer surface 18. Fibers 16 protruding through outer surface 18 can improve a bond between metal plating 24 and substrate 12. In some embodiments, a subset of fibers 16 can be disposed on or at outer surface 18. For example, fibers 16 can form a portion of outer surface 18 with individual fibers 16 separated by matrix 14. Fibers 16 disposed at outer surface 18 or protruding through outer surface 18 can be formed of a material capable of forming a high-strength bond with metal plating 24. Fibers 16 disposed at outer surface 18 or protruding through outer surface 18 can thereby improve a bond between metal plating 24 and substrate 12. For example, fibers 16 disposed at outer surface 18 or protruding through outer surface 18 can be formed of metal. In some embodiments, fibers 16 and metal plating 24 can be the same material. In some embodiments, a subset of fibers 16 formed of metal can be provided to improve bonding of metal plating 24, while bulk CTE of substrate 12 can be controlled primarily by a subset of fibers 16 formed of another material (e.g., carbon, para-aramid, or glass).

Selection of fiber 16 material, geometry, orientation relative to metal plating 24 or outer surface 18, and concentration can be made to provide substrate 12 with an expansion rate in outer region 20 in a plane parallel to metal plating 24 not exceeding the expansion rate of metal plating 24, while also improving a bond between substrate 12 and metal plating 24. While it is particularly important to control CTE mismatch between substrate 12 and metal plating 24 at the interface and an adjacent region to prevent separation of metal plating 24, it may not be necessary that all regions of substrate 12 have the same CTE as discussed further herein. In some embodiments, the composition of both fibers 16 and matrix 14 can vary from one region to another. The combination of materials can be selected to provide a desired bulk CTE and other material properties optimized for the operation of component 10. Metal plating 24 is disposed on outer surface 18. Metal plating can include but is not limited to chromium-nickel alloys or alloys containing at least one of nickel, cobalt, copper, iron, palladium, chromium, and cadmium. Metal plating 24 can be selected based on the operational environment of component 10 and performance requirements of component 10, including but not limited to operating temperatures, vibrational impacts, environmental contaminants, impact requirements, etc. Metal plating can have a thickness selected to achieve a desired strength of component 10 while minimizing the amount of weight metal plating 24 adds to substrate 12. Metal plating can have a thickness, for example, in a range of about 0.001 inches (0.0254 mm) to about 0.050 inches (1.27 mm). It may be desirable to provide metal plating 24 with a thickness outside of these ranges for some applications. Metal plating can be disposed directly on outer surface 18 of substrate 12. Metal plating 24 can cover all or portions of outer surface 18.

Figure 2:
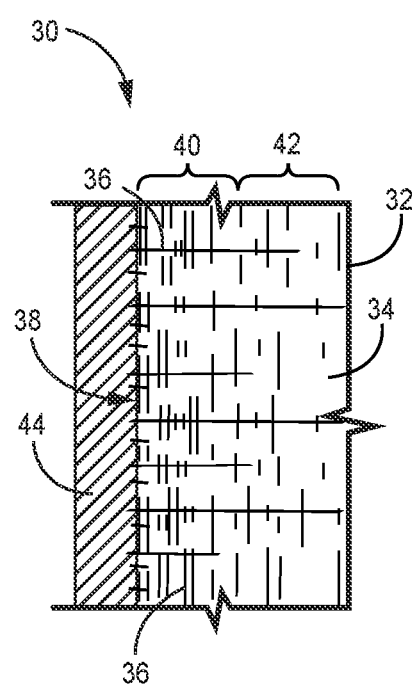
FIG. 2 is a simplified cross-sectional view of a portion of another embodiment of a metal-plated component.

FIG. 2 is a simplified cross-sectional view of a portion of another embodiment of a metal-plated plastic component. FIG. 2 shows component 30, substrate 32, matrix 34, fibers 36, outer surface 38, outer region 40, inner region 42, and metal plating 44. Component 30 can be substantially similar to component 10 with the exception of the placement of fibers 36. Matrix 34 and metal plating 44 can be substantially the same as matrix 14 and metal plating 24 of component 10 shown in FIG. 1 and described with respect thereto. As described further herein, portions of matrix 34 can be provided with or without fibers 36. For example, some regions of substrate 32 can be formed of matrix 34 without fibers 36.

Fibers 36 are embedded in matrix 34. Fibers 36 are selected and arranged to control a bulk coefficient of thermal expansion (CTE) of substrate 32, particularly in outer region 40 and outer surface 38. Fibers 36 are selected and arranged in substrate 32 to reduce a CTE mismatch between substrate 32 and metal plating 44. Substrate 32 with fibers 36 can be designed to have a bulk CTE, particularly in outer region 40 and at outer surface 38, substantially matching a CTE of metal plating 44 to prevent separation of metal plating 44 from outer surface 38 during operation of component 30 in varying temperatures. As further described herein, fibers 36 can be selected and arranged to meet additional functional requirements of component 30 including stress reduction, deflection management, and containment as described further herein.

Fibers 36 can be arranged in a concentration gradient extending from inner region 42 to outer surface 38 with inner region 42 having a lower concentration of fibers 36 than outer region 40. Inner region 42 can be defined as a region internal to component 30 and/or separated from outer surface 38. Outer region 40 is disposed between inner region 42 and outer surface 38 and extending to outer surface 38. In some embodiments, all or a portion of inner region 42 can be free of fibers 36. The arrangement of fibers 36 in this manner (i.e., concentration gradient) can produce a variation in CTE of substrate 12 from inner region 42 through outer region 40, however, the variation in CTE can be tailored to minimize an impact at outer surface 38 or the bond between metal plating 44 and substrate 32.

Fibers 36 can include but are not limited to carbon, metal, para-aramid (e.g., Kevlar® and Twaron®), glass, and combinations thereof. In some embodiments, fibers 36 can be formed of the same material as metal plating 44. In some embodiments, subsets of fibers 36 can be formed of different materials. Regions of substrate 32 can include fibers 36 formed of the same material or different materials. The combinations of materials forming matrix 14 and fiber 16 can vary throughout a component to provide desired material properties.

Fibers 36 can be continuous fibers, discontinuous fibers, or combinations thereof. Fibers 36 can have a filament diameter and length selected to minimize cracking of substrate 32 caused by separation at fiber-matrix interfaces. A concentration and arrangement of fibers 36 across inner region 42 and/or outer region 40 can be selected to provide substrate 32 with a bulk CTE at and adjacent to outer surface 38 substantially matching the CTE of metal plating 44. As shown in FIG. 2, fibers 36 can be provided in greatest concentration adjacent to outer surface 38.

As described with respect to FIG. 1, fibers 36 can be disposed to extend parallel and/or perpendicular or otherwise angled relative to outer surface 38 and metal plating 44. Fibers 36 extending perpendicular to otherwise angled relative to metal plating 44 can extend through outer surface 38. Fibers 36 protruding through outer surface 38 can improve a bond between metal plating 44 and substrate 32. In some embodiments, fibers 36 can be disposed on or at outer surface 38. For example, fibers 36 can form a portion of outer surface 38 with individual fibers 36 separated by matrix 34. Fibers 36 disposed at outer surface 38 or protruding through outer surface 38 can be formed of a material capable of forming a high-strength bond with metal plating 44. Fibers 36 disposed at outer surface 38 or protruding through outer surface 38 can thereby improve a bond between metal plating 44 and substrate 32. For example, fibers 36 disposed at outer surface 38 or protruding through outer surface 38 can be formed of metal. In some embodiments, fibers 36 and metal plating 44 can be the same material. A subset of fibers 36 formed of metal can be provided to improve bonding of metal plating 44, while bulk CTE of substrate 32 can be controlled primarily by a subset of fibers 36 formed of another material (e.g., carbon, para-aramid, or glass).

Selection of fiber 36 material, geometry, orientation relative to metal plating 44 or outer surface 38, and concentration can be made to provide substrate 32 with an expansion rate in outer region 40 in a plane parallel to metal plating 44 not exceeding the expansion rate of metal plating 44, while also improving a bond between substrate 32 and metal plating 44.

Figure 3:
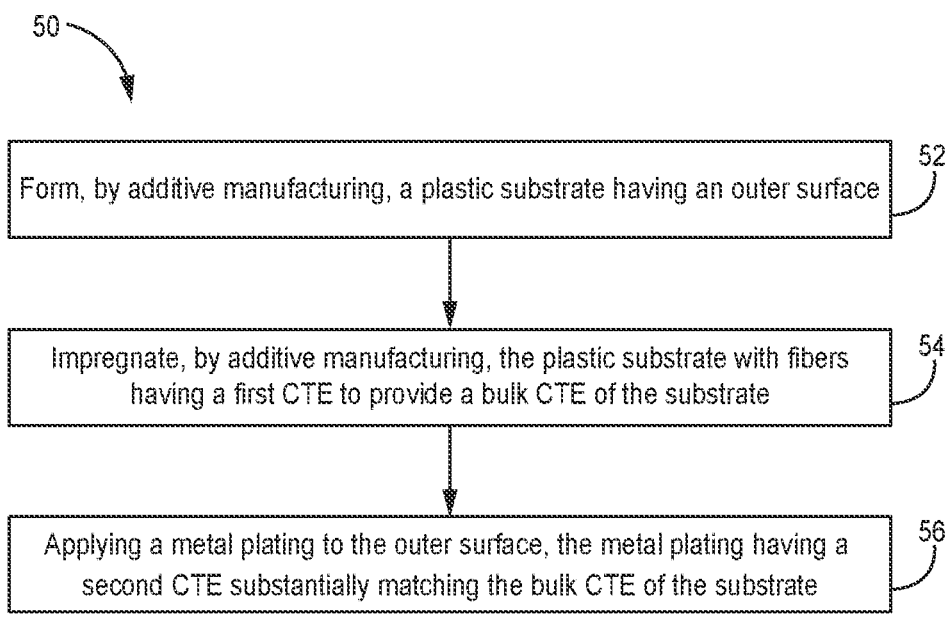
FIG. 3 is a flowchart of a method for forming a metal-plated component.

FIG. 3 is a flowchart of a method forming a metal-plated component according to the present disclosure. FIG. 3 shows method 50. Step 52 includes forming, by an additive manufacturing process, a plastic substrate (e.g., substrate 12 or 32) having an outer surface. The substrate can be formed by 3D plastic printing by depositing a matrix material, such as matrix materials 14 and 34 shown in FIGS. 1 and 2 and described with respect thereto.

Step 54 includes impregnating, by the additive manufacturing process, the substrate with fibers. Fibers can be fibers 16 and 36 shown in FIGS. 1 and 2 and described with respect thereto. As previously described, the fibers can be selected and arranged to provide desired material properties. Fibers can be co-extruded with the matrix material to form the substrate with fibers embedded in the matrix. The addition of fibers to the matrix material produces a substrate with a bulk CTE less than a CTE of the matrix material.

In some embodiments, fibers can be arranged in concentration and/or material gradients as previously described. Fiber arrangement can be controlled by the 3D printing process. In some embodiments, a dual nozzle can be used to extrude materials of different fiber compositions and/or fiber concentrations and selectively print the different material in different regions of the substrate. For example, step 54 can include selectively printing the fibers in a concentration gradient extending from an inner region of the plastic substrate to the outer surface of the plastic substrate, such that the concentration of fibers increases from the inner region toward the outer surface of the plastic substrate. In other embodiments, step 54 can include selectively printing the fibers in a region adjacent to the outer surface of the plastic substrate and/or at an angle relative to the outer surface and/or such that fibers protrude through the outer surface of the plastic substrate to improve bonding with a metal plating applied on the outer surface. In some embodiments, step 54 can include selectively printing the plastic substrate without the fibers (e.g., matrix material only) in an inner region of the plastic substrate.

Step 56 includes applying a metal plating to the outer surface of the substrate. Metal plating can be metal plating 24 and 44 shown in FIGS. 1 and 2 and described with respect thereto. The metal plating can be selectively applied to one or more locations on the outer surface (e.g., locations susceptible to damage by abrasion, etc.). The metal plating has a CTE substantially matching the bulk CTE of the substrate or bulk CTE of the substrate in a region adjacent to the outer surface of the substrate in the location metal plating is to be applied. The metal plating can be applied, for example by electroless plating. In some examples, a printer with a dual nozzle can be used to selectively print a catalyst material layer on all or portions of an outer surface of the substrate. For example, one nozzle can extrude the substrate material (matrix and fiber) and one nozzle can extrude the matrix material loaded with a catalyst. The metal plating can then be formed on the outer surface loaded with the catalyst through a process of electroless plating.

Figure 4:
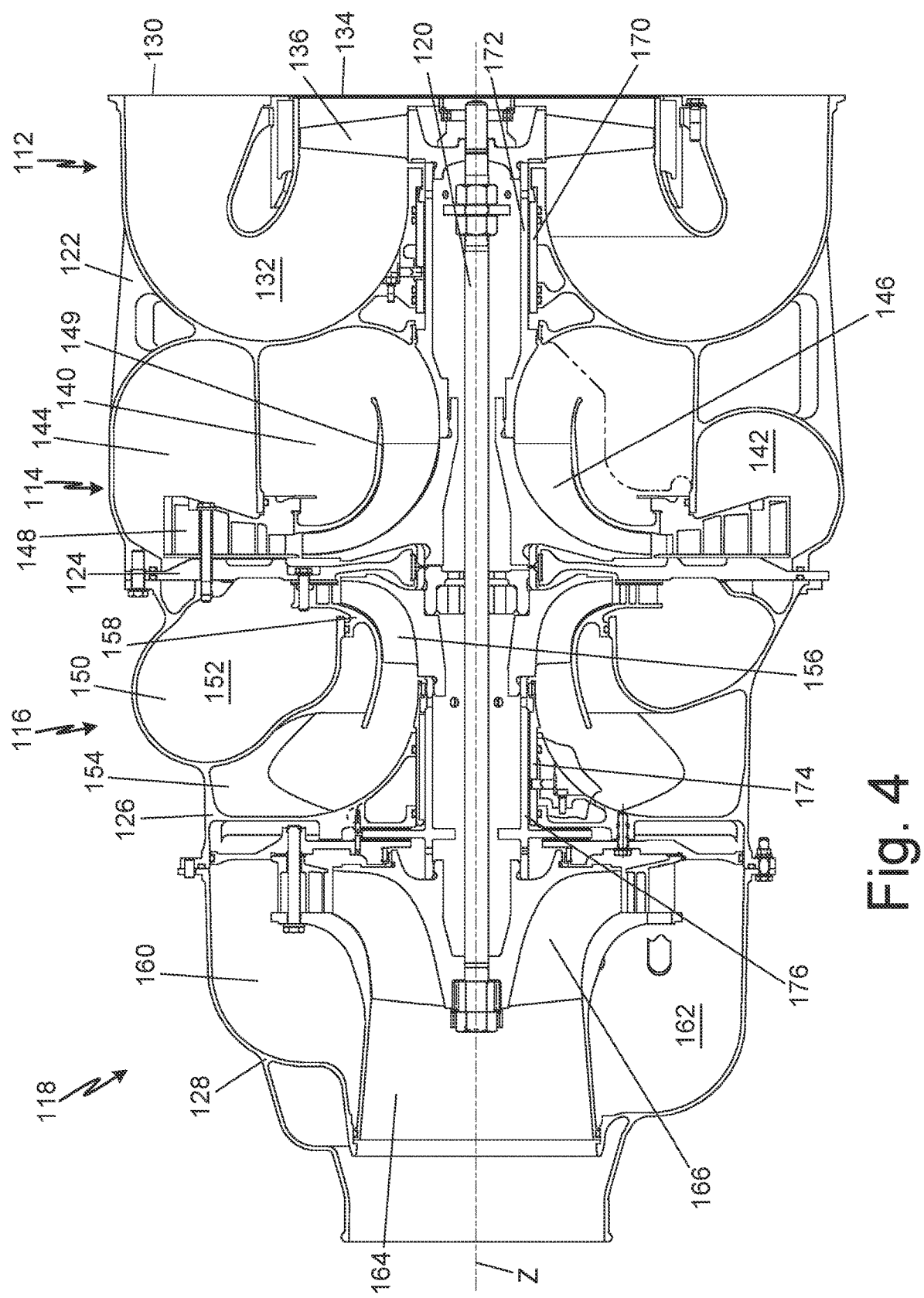
FIG. 4 is a cross-sectional view of a rotary machine.

FIG. 4 is a cross-sectional view of turbomachine 110, which can be an air cycle machine. Turbomachine 110 includes fan section 112, compressor section 114, first turbine section 116, second turbine section 118, tie rod 120, fan and compressor housing 122, seal plate 124, first turbine housing 126, and second turbine housing 128. Fan section 112 includes fan inlet 130, fan duct 132, fan outlet 134, and fan rotor 136. Compressor section 114 includes compressor inlet 140, compressor duct 142, compressor outlet 144, compressor rotor 146, compressor diffuser 148, and compressor shroud 149. First turbine section 116 includes first turbine inlet 150, first turbine duct 152, first turbine outlet 154, first turbine rotor 156, and first turbine rotor shroud 158. Second turbine section 118 includes second turbine inlet 160, second turbine duct 162, second turbine outlet 164, and second turbine rotor 166. Turbomachine 110 also includes first journal bearing 170, first rotating shaft 172, second journal bearing 174, and second rotating shaft 176. Also shown in FIG. 1 is axis Z.

Fan section 112, compressor section 114, first turbine section 116, and second turbine section 118 are all mounted on tie rod 120. Tie rod 120 rotates about axis Z. Fan and compressor housing 122 houses fan section 112 and compressor section 114. Fan and compressor housing 122 is connected to seal plate 124 and first turbine housing 126 with fasteners. Seal plate 124 is positioned between fand and compressor housing 122 and first turbine housing 126. Seal plate 124 separates flow paths in fan and compressor housing 122 from flow paths in first turbine housing 126. First turbine housing 126 houses first turbine section 116. First turbine housing 126 is connected to second turbine housing 128 with fasteners. Second turbine housing 128 houses second turbine section 118. Fan and compressor housing 122, first turbine housing 126, and second turbine housing 128 together form an overall housing for turbomachine 110.

Fan section 112 includes fan inlet 130, fan duct 132, fan outlet 134, and fan rotor 136. Fan section 112 typically draws in ram air from a ram air scoop. Alternatively, air is drawn into fan section 112 from an associated gas turbine or other aircraft component. Air is drawn into fan inlet 130 and is ducted through fan duct 132 to fan outlet 134. Fan rotor 136 is positioned in fan duct 132 adjacent to fan outlet 134 and is mounted to and rotates with tie rod 120. Fan rotor 136 draws air into fan section 112 to be routed through turbomachine 110.

Compressor section 114 includes compressor inlet 140, compressor duct 142, compressor outlet 144, compressor rotor 146, and compressor diffuser 148. Air is routed into compressor inlet 140 and is ducted through compressor duct 142 to compressor outlet 144. Compressor rotor 146 and compressor diffuser 148 are positioned in compressor duct 142. Compressor rotor 146 is mounted to and rotates with tie rod 120 to compress the air flowing through compressor duct 142. Compressor diffuser 148 is a static structure through which the compressor air can flow after it has been compressed with compressor rotor 146. Air exiting compressor diffuser 148 can then exit compressor duct 142 through compressor outlet 144. Compressor shroud 149 is positioned radially outward from and partially surrounds compressor rotor 146.

First turbine section 116 includes first turbine inlet 150, first turbine duct 152, first turbine outlet 154, first turbine rotor 156, and first turbine rotor shroud 158. Air is routed into first turbine inlet 150 and is ducted through first turbine duct 152 to first turbine outlet 154. First turbine rotor 156 is positioned in first turbine duct 152 and is mounted to and rotates with tie rod 120. First turbine rotor 156 will extract energy from the air passing through first turbine section 116 to drive rotation of tie rod 120. First turbine rotor shroud 158 is positioned radially outward from and surrounds first turbine rotor 156.

Second turbine section 118 includes second turbine inlet 160, second turbine duct 162, second turbine outlet 164, and second turbine rotor 166. Air is routed into second turbine inlet 160 and is ducted through second turbine duct 162 to second turbine outlet 164. Second turbine rotor 166 is positioned in second turbine duct 162 and is mounted to and rotates with tie rod 120. Second turbine rotor 166 will extract energy from the air passing through second turbine section 118 to drive rotation of tie rod 120.

Figure 5:
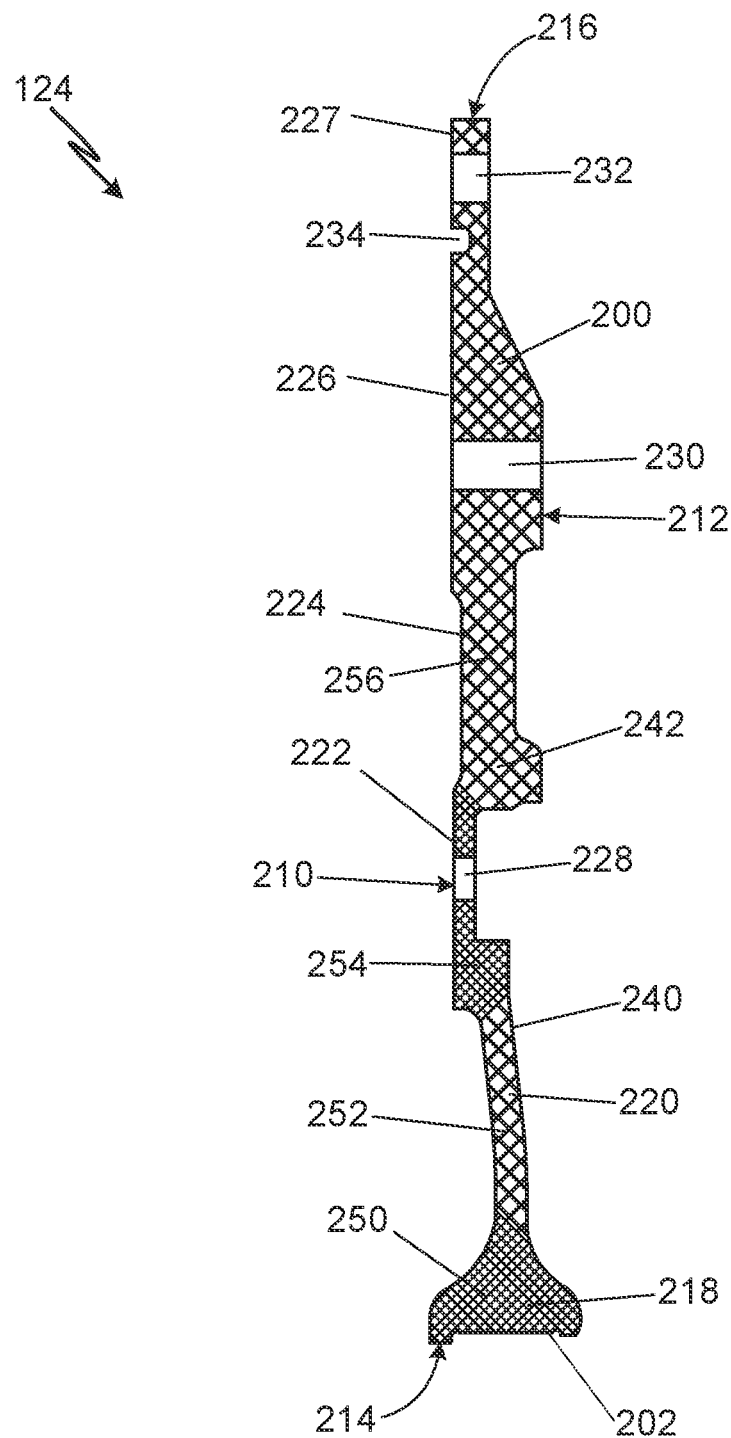
FIG. 5 is a cross-sectional view of a seal plate of the rotary machine of FIG. 4.

Turbomachine 110 also includes first journal bearing 170, first rotating shaft 172, second journal bearing 174, and second rotating shaft 176. First journal bearing 170 partially surrounds and reports first rotating shaft 172. First rotating shaft 172 connects to and rotates with fan rotor 136 and compressor rotor 146. Second journal bearing 174 partially surrounds and supports second rotating shaft 176. Second rotating shaft connects to and rotates with first turbine rotor 156 and second turbine rotor FIG. 5 is a cross-sectional view of a portion of seal plate 124. Seal plate 124 includes body 200 and bore 202. Body 200 includes first side 210, second side 212, radially inner end 214, radially outer end 216, hub 218, first disk portion 220, second disk portion 222, third disk portion 224, fourth disk portion 226, fifth disk portion 227, first plurality of holes 228, second plurality of holes 230, third plurality of holes 232, and groove 234. Body 200 further includes outer surface 240 and fiber-reinforced plastic structure 242, which includes first region 250, second region 252, third region 254, and fourth region 256.

Seal plate 124 includes body 200 with bore 202 extending through a center of body 200. Body 200 has a plate shape and includes first side 210 and second side 212 opposite of first side 210. Body 200 also has radially inner end 214 and radially outer end 216 opposite of radially inner end 214. Radially inner end 214 of body 200 defines bore 202, which extends through body 200 of seal plate 124.

Body 200 includes hub 218, first disk portion 220, second disk portion 222, third disk portion 224, fourth disk portion 226, and fifth disk portion 227. Hub 218 is located at radially inner end 214 of seal plate, adjacent to bore 202. Hub 218 has a funnel-shaped cross section with a flared end near radially inner end 214. Hub 218 narrows toward radially outer end 216. First disk portion 220 of body 200 extends radially outward from the narrow end of hub 218. First disk portion 220 curves toward first side 210. Second disk portion 222 of body 200 extends radially outward from first disk portion 220. Second disk portion 222 is plateau-shaped on first side 210 of seal plate 124. Second disk portion 222 has a channel in second side 212 of seal plate 124. A fillet is located on first side 210 where second disk portion 222 meets first disk portion 220. Third disk portion 224 of body 200 extends radially outward from second disk portion 222. Third disk portion 224 has a channel shape on first side 210. The channel of third disk portion 224 has a first fillet on first side 210 of seal plate 124 where third disk portion 224 meets second disk portion 222. The channel of third disk portion 224 has a second fillet on first side 210 where third disk portion 224 meets fourth disk portion 226. Fourth disk portion 226 of body 200 extends radially outward from third disk portion 224. Fourth disk portion 226 is flat on first side 210. Second side 212 of fourth disk portion 226 includes a fillet, a flat portion, and a slanted portion. Fifth disk portion 227 extends to radially outer end 216. Fifth disk portion 227 has a uniform thickness. Fifth disk portion 227 begins where the slanted portion of fourth disk portion 226 on second side 212 of seal plate 124 ends.

First plurality of holes 228 are positioned around and extend through second disk portion 222 of body 200. First plurality of holes 228 are positioned in a channel on second side 212 of second portion 222. Second plurality of holes 230 are positioned around and extend through fourth disk portion 226 of body 200. Second plurality of holes 230 are through the flat portion on second side 212 of fourth disk portion 226. Second plurality of holes are evenly spaced around seal plate 124. Third plurality of holes 232 are positioned around and extend through fifth disk portion 227 of body 200. Third plurality of holes 232 are evenly spaced around seal plate 124. Groove 234 is positioned in fifth disk portion 227 of body 200 and extends into body 200 from first side 210. Groove 234 is configured to receive an O-ring to seal against other components of turbomachine 110. Groove 234 is radially inward from third plurality of holes 232.

Body 200 further includes outer surface 240 and fiber-reinforced plastic structure 242. Outer surface 240 is a solid, continuous surface that surrounds fiber-reinforced plastic structure 242. Outer surface 240 can include metal plating, for example metal plating 24 as discussed in relation to FIG. 1 or metal plating 44 as discussed in relation to FIG. 2. The metal plating can be positioned on the entirety of or portions of outer surface 240 to help increase strength and reduce degradation of seal plate 124 from abrasives moving through turbomachine 110 (shown in FIG. 4).

Fiber-reinforced plastic structure 242 can include a matrix (for example, matrix 14 and matrix 34) and a fiber (for example, fiber 16 and fiber 36). Fiber material and arrangement (e.g., orientation and density) can be selected as previously described to control the bulk CTE of fiber-reinforced plastic structure 242 and, particularly a CTE of fiber-reinforced plastic structure 242 in locations of seal plate 124 adjacent to locations where the metal plating is provided to improve a bond between fiber-reinforced plastic structure 242 and the metal plating.

Fiber density in fiber-reinforced plastic structure 242 can vary between regions of seal plate 124. The embodiment of FIG. 5 includes first region 250, second region 252, third region 254, and fourth region 256. First region 250 is a region of fiber-reinforced plastic structure 242 positioned in hub 218 of body 200. Second region 252 is a region of fiber-reinforced plastic structure 242 in first disk portion 220 of body 200. Third region 254 is a region of fiber-reinforced plastic structure 242 in second disk portion 222 of body 200 that surrounds first plurality of bolt holes 228. Third region 254 extends from the fillet between second disk portion 222 and first disk portion 220. Fourth region 256 is a region of fiber-reinforced plastic structure 242 in third disk portion 224, fourth disk portion 226, and fifth disk portion 227 of body 200. Second plurality of holes 230, groove 234, and third plurality of holes 232 are in fourth region 256.

Fiber density can be increased in regions subject to deflection or increased stress during rotation of rotor 126 to aid in deflection management, stress reduction, and energy containment. Fiber-reinforced plastic structure 242 can include regions with varying fiber densities, including first region 250, second region 252, third region 254 and fourth region 256. Density of fiber in fiber-reinforced plastic structure 242 may vary gradually or abruptly between regions. In the embodiment in FIG. 5, first region 250 and third region 254 have greater densities of fiber than second region 252 and fourth region 256.

Seal plate 124 is a metal-plated plastic component formed according to the present disclosure and including a fiber-reinforced matrix (also referred to as fiber-reinforced plastic structure 242) as disclosed in FIGS. 1 and 2 and variations thereof. Fibers can be selected and arranged to control thermal expansion of the plastic component relative to the metal plating and a bulk thermal expansion coefficient of seal plate 124 to manage deflection of seal plate 124 during operation. The metal plating on outer surface 240 can be disposed on one or more portions of seal plate 124. In some embodiments, application of the metal plating can be limited to regions susceptible to damage to reduce the weight of seal plate 124.

Traditional seal plates for rotary machines have solid cross-sections and are manufactured by subtractive manufacturing processes, such as hogout, or compression molding. Additively manufacturing (or 3D printing) seal plate 124 allows fiber-reinforced plastic structure 242 to have varying densities of fiber and include metal plating on outer surface 240. Using fiber-reinforced plastic structure 242 in seal plate 124 allows seal plate 124 to have a reduced weight compared to traditional seal plates while providing deflection control, stress reduction, and energy containment provided in traditional metal seal plates. Further, including metal plating on outer surface 240 allows for abrasion resistance in those areas of seal plate 124 with the metal plating.

Figure 6:
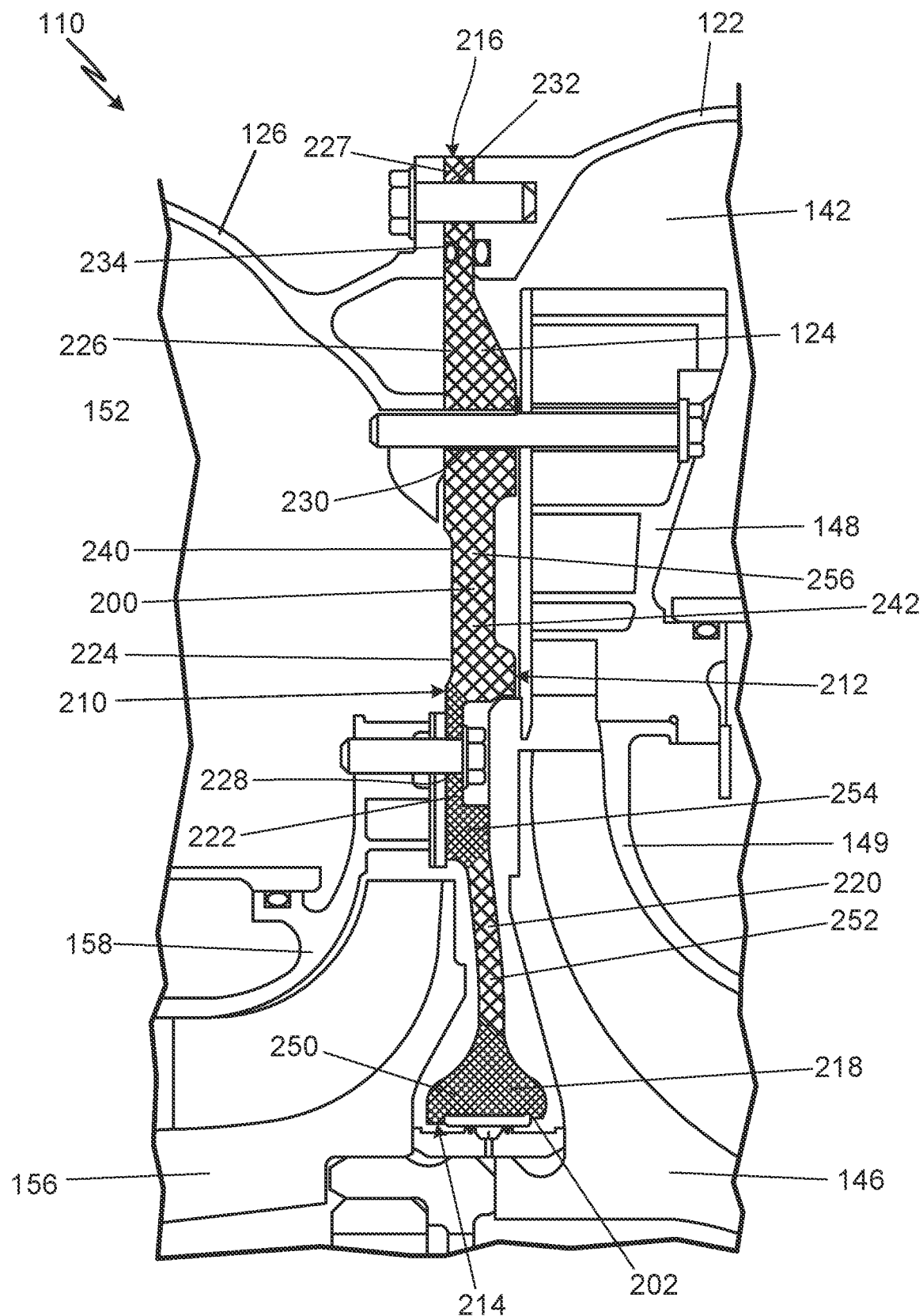
FIG. 6 is a cross-sectional view of the seal plate positioned in the rotary machine.

FIG. 6 is a cross-sectional view of seal plate 124 positioned in turbomachine 110. FIG. 6 shows fan and compressor housing 122, seal plate 124, first turbine housing 126, compressor duct 142, compressor rotor 146, compressor diffuser 148, compressor shroud 149, first turbine duct 152, first turbine rotor 156, first turbine rotor shroud 158. Seal plate 124 includes body 200 and bore 202. Body 200 includes first side 210, second side 212, radially inner end 214, radially outer end 216, hub 218, first disk portion 220, second disk portion 222, third disk portion 224, fourth disk portion 226, first plurality of holes 228, second plurality of holes 230, third plurality of holes 232, and groove 234. As shown in FIG. 5, body 200 further includes outer surface 240 and fiber-reinforced plastic structure 242, which includes first region 250, second region 252, third region 254, and fourth region 256.

Turbomachine 110 has the structure and design as described above in reference to FIG. 4. Seal plate 124 has the structure and design as described above in reference to FIG. 5. Hub 218 of seal plate 124 abuts a seal that interfaces with rotating components, including compressor rotor 146 and first turbine rotor 156 of turbomachine 110. A first side of first disk portion 220 of seal plate 124 is positioned adjacent first rubine rotor 156, and a second side of first disk portion 220 of seal plate 124 is positioned adjacent compressor rotor 146. A first side of second disk portion 222 of seal plate 124 abuts first turbine rotor shroud 158. Bolts extend through first plurality of holes 228 in second disk portion 222 to bolt seal plate 124 to first turbine rotor shroud 158. A second side of second disk portion 222 of seal plate 124 is positioned adjacent to a radially outer end of compressor rotor 146. A second side of third disk portion 224 is adjacent to compressor diffuser 148. A first side of fourth disk portion 226 of seal plate 124 abuts a flange of first turbine housing 126, and a second side of fourth disk portion 226 abuts compressor diffuser 148. Bolts extend through second plurality of holes 230 to bolt seal plate 124 between compressor diffuser 148 and first turbine housing 126. Fifth disk portion 227 of seal plate 124 is positioned between and fan and compressor housing 122 and first turbine housing 126. Bolts extend through third plurality of holes 232 to bolt seal plate 124 between fan and compressor housing 122 and first turbine housing 126.

First region 250 of seal plate 124 is a deflection region, which is a region of seal plate 124 that is subject to deflection during operation of turbomachine 110. Third region 254 is also a deflection region. As compressor rotor 146 and first turbine rotor 156 rotate, first region 250 in hub 218 and second region in third disk portion 222 are subject to deflection. First region 250 and second region 254 of fiber-reinforced plastic structure 242 are areas of increased fiber density that aid in reducing and preventing deflection of seal plate 124, thereby reducing clearances in turbomachine 110 and increasing efficiency.

Turbomachine 110 includes clearances between moving components (for example, compressor rotor 146 and first turbine rotor 156) and non-moving components (for example, seal plate 124). Clearances reduce contact between moving and non-moving components and resultant damage and/or failure of turbomachine 110. Clearances account for deflections of both moving and non-moving components during operation of turbomachine 110. More deflection in components means larger clearances and reduced efficiency in turbomachine 110 caused by air leaks through the clearances. Reducing deflection by identifying deflection regions (for example, first region 250 and third region 254 of seal plate 124) means clearances can be reduced, thereby increasing efficiency of turbomachine 110. Reducing deflection can be accomplished by increasing stiffness (by increased density of fiber in fiber-reinforced plastic structure 242 or adding metal plating to outer surface 240) in a region.

Third region 154 of seal plate 124 is also a stress region, which is a region of seal plate 124 that is subject to and adapted to withstand high stress during operation of turbomachine 110. Third region 254 is subject to adapted to withstand higher stress than other regions of seal plate 124. Third region 254 of fiber-reinforced plastic structure 242 is an area of increased fiber density that aids in stress reduction during operation of turbomachine 110 to reduce the stress in third region 254 of seal plate 124.

Reducing stress in stress regions of seal plate 124 improves the longevity of seal plate 124. Reducing the stresses at stress regions can reduce the failure rate of seal plate 124 as well as the failure rate of turbomachine 110 overall. During operation, these failures can damage components surrounding seal plate 124 and decrease aircraft and passenger safety. Reduced failure rates result in reduced repairs, down time, and operating costs.

Third region 254 is also an energy containment region of seal plate 124, which is a region of seal plate 124 that is designed to absorb energy. Third region 254 in second disk portion 122 is positioned adjacent to a radially outer end of compressor rotor 146 absorbs energy from compressor rotor 146 in the event of a failure. Third region 254 of fiber-reinforced plastic structure 242 is an area of increased fiber density that aids in energy containment during failure of moving components in turbomachine 110. Increased energy containment is important to the safe operation of turbomachine 110. If compressor rotor 146 fails, seal plate 24 is designed to absorb the energy to protect and prevent serious damage to other components of turbomachine 110. Third region 154 of lattice structure 142 is positioned near compressor rotor 146 to contain the energy from failure of compressor rotor 146 in seal plate 124.

Seal plate 124 is one example of a metal plated fiber-reinforced plastic seal plate. In alternate embodiments, variations of the disclosed metal-plated fiber-reinforced plastic structure 242 can be used in any suitable seal plate, for example a cabin air compressor seal plate, having any design. Further, turbomachine 110 is one example of a turbomachinery or rotary machine in which seal plate 124 or any other seal plate with metal plated fiber-reinforced plastic structure 242 or variations thereof can be used.

The disclosed metal-plated plastic seal plate components with controlled thermal expansion behavior have an increased durability in environments of varying temperature or temperature gradients. Additional benefits of the disclosed metal-plated components include reduced weight, reduced costs, and faster design, manufacturing, and testing time. Additionally, plastic parts are not prone to static electric charging.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

In one aspect, a seal plate for a rotary machine includes a hub centered on a central axis and a disk portion extending radially outward from the hub. The hub and the disk portion include a plastic substrate and metal plating disposed on at least a portion of an outer surface of the plastic substrate. The plastic substrate has a matrix material and fibers embedded in the matrix material. The fibers have a first coefficient of thermal expansion. The metal plating has a second coefficient of thermal expansion. A bulk coefficient of thermal expansion of the plastic substrate at the outer surface of the plastic substrate substantially matches the second coefficient of thermal expansion of the metal plating.

The following are non-exclusive descriptions of possible embodiments of the present invention.

The seal plate of the preceding paragraph can optionally include, additionally and/or alternatively, any one or more of the following features, configurations and/or additional components:

In an embodiment of the seal plate of the preceding paragraph, the fibers are selected such that at least one of a fiber material, a fiber density, or a fiber orientation is selected so the bulk coefficient of thermal expansion of the plastic substrate at the outer surface of the plastic substrate substantially matches the second coefficient of thermal expansion of the metal plating.

In an embodiment of the seal plate of any of the preceding paragraphs, the matrix material can have a third coefficient of thermal expansion, the third coefficient of thermal expansion greater than the first coefficient of thermal expansion of the fibers.

In an embodiment of the seal plate of any of the preceding paragraphs, the first coefficient of thermal expansion of the fibers can be less than the second coefficient of thermal expansion of the metal plating.

In an embodiment of the seal plate of any of the preceding paragraphs, the fibers can be selected from the group consisting of carbon, para-aramid, glass, metal, and combinations thereof.

In an embodiment of the seal plate of any of the preceding paragraphs, the metal plating and the fibers can be the same material.

In an embodiment of the seal plate of any of the preceding paragraphs, a fiber density of the fibers embedded in the matrix material varies within the substrate.

In an embodiment of the seal plate of any of the preceding paragraphs, the substrate can include a first region having a reduced fiber density and one or more second regions having an increased fiber density. The one or more second regions can be a deflection region, a stress region, and/or an energy containment region of the seal plate. The deflection region is subject to deflections during operation of the rotary machine. The stress region adapted to withstand higher stress than other regions of the seal plate during operation of the rotary machine. The energy containment region is configured to contain energy of failed components of the rotary machine.

In an embodiment of the rotating shaft of any of the preceding paragraphs, the fiber density gradually transitions between the first region having a reduced fiber density and the one or more second regions having an increased fiber density.

In an embodiment of the rotating shaft of any of the preceding paragraphs, the fiber density abruptly transitions between the first region having a reduced fiber density and the one or more second regions having an increased fiber density.

In an embodiment of the seal plate of any of the preceding paragraphs, the stress region is a region surrounding a bolt hole in the disk portion of the seal plate.

In an embodiment of the seal plate of any of the preceding paragraphs, the deflection region is a region surrounding a bolt hole in the disk portion of the seal plate.

In an embodiment of the seal plate of any of the preceding paragraphs, the deflection region is the hub of the seal plate.

In an embodiment of the seal plate of any of the preceding paragraphs, the energy containment region is a region surrounding a bolt hole in the disk portion of the seal plate.

In an embodiment of the seal plate of any of the preceding paragraphs, the second shaft portion extending from the flange.

In an embodiment of the seal plate of any of the preceding paragraphs, an outer region disposed adjacent to the metal coating has an increased fiber density.

In an embodiment of the seal plate of any of the preceding paragraphs, the fibers of the outer region protrude through the outer surface of the plastic substrate.

A method of forming a seal plate for a rotary machine includes forming, by an additive manufacturing process, a plastic substrate having an outer surface, impregnating, by the additive manufacturing process, the plastic substrate with fibers having a first coefficient of thermal expansion, and applying a metal plating to the outer surface of the plastic substrate. The metal plating has a second coefficient of thermal expansion. A bulk coefficient of thermal expansion of the plastic substrate at the outer surface of the plastic substrate substantially matches the second coefficient of thermal expansion of the metal plating. The plastic substrate and the metal plating together form the seal plate having a hub centered on a central axis and having a disk portion extending radially outwards from the hub.

The method of the preceding paragraph can optionally include, additionally and/or alternatively, any one or more of the following features, configurations, additional components, and/or steps:

In an embodiment of the method of the preceding paragraph, a fiber material, a fiber density, or a fiber orientation is selected such that the bulk coefficient of thermal expansion of the plastic substrate at the outer surface of the plastic substrate substantially matches the second coefficient of thermal expansion of the metal plating.

In an embodiment of the method of any of the preceding paragraphs, the additive manufacturing process can be 3D printing.

In an embodiment of the method of any of the preceding paragraphs, the step of impregnating can include selectively printing the fibers to vary a fiber density in the plastic substrate.

In an embodiment of the method of any of the preceding paragraphs, to form a region of increased fiber density adjacent to the portion of the outer surface of the plastic substrate to which the metal plating is applied.

In an embodiment of the method of any of the preceding paragraphs, the step of impregnating can include selectively printing fibers at an angle relative to the portion of the outer surface to which the metal plating is applied.

In an embodiment of the method of any of the preceding paragraphs, the plastic of the plastic substrate can have a third coefficient of thermal expansion, the third coefficient of thermal expansion greater than the first coefficient of thermal expansion of the fibers.

In an embodiment of the method of any of the preceding paragraphs, the first coefficient of thermal expansion of the fibers can be less than the second coefficient of thermal expansion of the metal plating.

In an embodiment of the method of any of the preceding paragraphs, the fibers can be selected from the group consisting of carbon, para-aramid, glass, metal, and combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal plate for a rotary machine, the seal plate comprising:
   a hub with a bore configured to be centered on a central axis of the rotary machine; and
   a disk portion extending radially outwards from the hub, the hub and the disk portion together comprising:
      a plastic substrate, the plastic substrate comprising:
         a matrix material; and
         fibers embedded in the matrix material, the fibers having a first coefficient of thermal expansion; and
      a metal plating disposed on at least a portion of an outer surface of the plastic substrate, the metal plating having a second coefficient of thermal expansion of the metal plating;
      wherein a bulk coefficient of thermal expansion of the plastic substrate at the outer surface of the plastic substrate substantially matches the second coefficient of thermal expansion of the metal plating.

2. The seal plate of claim 1, wherein the matrix material has a third coefficient of thermal expansion, the third coefficient of thermal expansion greater than the first coefficient of thermal expansion of the fibers.

3. The seal plate of claim 2, wherein the first coefficient of thermal expansion of the fibers is less than the second coefficient of thermal expansion of the metal plating.

4. The seal plate of claim 1, wherein the fibers are selected from the group consisting of carbon, para-aramid, glass, metal, and combinations thereof.

5. The seal plate of claim 4, wherein the metal plating and the fibers are the same material.

6. The seal plate of claim 1, wherein the substrate comprises regions of varying fiber density.

7. The seal plate of claim 6, wherein the regions of varying fiber density comprise:
   a first region having a reduced fiber density; and
   one or more second regions having an increased fiber density;
   wherein the one or more second regions is a deflection region, a stress region, and/or an energy containment region of the seal plate, the deflection region subject to deflections during operation of the rotary machine, the stress region adapted to withstand higher stress than other regions of the seal plate during operation of the rotary machine, and the energy containment region configured to contain energy of failed components of the rotary machine.

8. The seal plate of claim 7, wherein the stress region is a region surrounding a bolt hole in the disk portion of the seal plate.

9. The seal plate of claim 7, wherein the deflection region is a region surrounding a bolt hole in the disk portion of the seal plate, and/or wherein the deflection region is the hub of the seal plate.

10. The seal plate of claim 7, wherein the energy containment region is a region surrounding a bolt hole in the disk portion of the seal plate.

11. The seal plate of claim 6, wherein an outer region disposed adjacent to the metal coating has an increased fiber density.

12. The seal plate of claim 11, wherein the fibers of the outer region protrude through the outer surface of the plastic substrate.

13. The seal plate of claim 11, wherein fibers of the outer region are angled with respect to the outer surface of the plastic substrate.

14. A method of forming a seal plate for a rotary machine, the method comprising:
    forming, by an additive manufacturing process, a plastic substrate having an outer surface;
    impregnating, by the additive manufacturing process, the plastic substrate with fibers having a first coefficient of thermal expansion, such that the fibers are embedded in a matrix material of the plastic substrate; and
    applying a metal plating to at least a portion of the outer surface of the plastic substrate, the metal plating having a second coefficient of thermal expansion;
    wherein a bulk coefficient of thermal expansion of the plastic substrate at the outer surface of the plastic substrate substantially matches the second coefficient of thermal expansion of the metal plating;
    wherein the plastic substrate and the metal plating together form the seal plate having a hub with a bore configured to be centered on a central axis of the rotary machine and having a disk portion extending radially outwards from the hub.

15. The method of claim 14, wherein the additive manufacturing process is 3D printing.

16. The method of claim 15, wherein the step of impregnating comprises selectively printing the fibers to vary a fiber density in the plastic substrate.

17. The method of claim 16, wherein the step of impregnating comprises:
    selectively printing fibers to form a region of increased fiber density adjacent to the portion of the outer surface of the plastic substrate to which the metal plating is applied; and/or
    selectively printing fibers at an angle relative to the portion of the outer surface to which the metal plating is applied.

18. The method of 16, wherein the plastic of the plastic substrate has a third coefficient of thermal expansion, the third coefficient of thermal expansion greater than the first coefficient of thermal expansion of the fibers.

19. The method of 18, wherein the first coefficient of thermal expansion of the fibers is less than the second coefficient of thermal expansion of the metal plating.

20. The method of claim 19, wherein the fibers are selected from the group consisting of carbon, para-aramid, glass, metal, and combinations thereof.

* * * * *